United States Patent
Suzuki et al.

(10) Patent No.: US 8,498,449 B2
(45) Date of Patent: Jul. 30, 2013

(54) EYE DETECTING DEVICE, EYE DETECTING METHOD, AND PROGRAM

(75) Inventors: Tomoharu Suzuki, Anjo (JP); Takashi Hiramaki, Nagoya (JP); Kenichi Ohue, Toyota (JP); Kentaro Takahashi, Toyota (JP); Satoru Nakanishi, Aichi-ken (JP); Shinichi Kojima, Nisshin (JP)

(73) Assignees: Aisin Seiki Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 864 days.

(21) Appl. No.: 12/517,509

(22) PCT Filed: Dec. 3, 2007

(86) PCT No.: PCT/JP2007/073311
§ 371 (c)(1),
(2), (4) Date: Jul. 31, 2009

(87) PCT Pub. No.: WO2008/069171
PCT Pub. Date: Jun. 12, 2008

(65) Prior Publication Data
US 2010/0014759 A1    Jan. 21, 2010

(30) Foreign Application Priority Data
Dec. 4, 2006 (JP) ................. 2006-327430

(51) Int. Cl.
*G06K 9/00* (2006.01)
*G06K 9/66* (2006.01)
*G08B 13/194* (2006.01)

(52) U.S. Cl.
USPC ........... 382/117; 382/104; 382/118; 382/181; 382/190; 382/199; 340/575; 340/576

(58) Field of Classification Search
USPC .. 382/117, 104, 118, 181, 190, 199; 340/575, 340/576
See application file for complete search history.

(56) References Cited

U.S. PATENT DOCUMENTS 5,432,866 A * 7/1995 Sakamoto .................. 382/128
5,455,601 A   10/1995 Ozaki
(Continued)

FOREIGN PATENT DOCUMENTS

| CN | 1299498 A | 6/2001 |
| EP | 1701289 A1 | 9/2006 |

(Continued)

OTHER PUBLICATIONS

Japanese Office Action issued in JP 2007-071524 dated Jan. 20, 2009 (10 pages).

(Continued)

*Primary Examiner* — Michael A Newman
(74) *Attorney, Agent, or Firm* — Sughrue Mion, PLLC

(57) ABSTRACT

An eye part detecting device has an image input section (21) for acquiring a face image, an eyelid edge labeling section (24) for detecting upper eyelid candidates and lower eyelid candidates which satisfy predetermined conditions for upper eyelids or lower eyelids in the face image, and an eyelid determination section (27) for comparing combinations of the upper and lower eyelid candidates to determine the combination of the upper and lower eyelid candidates whose relation best satisfies a predetermined condition as the upper and lower eyelids. The eyelid edge labeling section (24) classifies the horizontal edges and vertical edges calculated by an edge calculating section (23) into the upper eyelid candidates and the lower eyelid candidates according to a degree of how well the predetermined conditions are satisfied. A lower eyelid candidate evaluating section (26) may be provided for excluding a lower eyelid candidate when it has at least one horizontal edge present in a lateral direction of the lower eyelid candidate. A lower eyelid candidate discriminating section (25) may be provided for discriminating that of the lower eyelid candidates whose vertical edge does not satisfy the predetermined condition as a lower eyelid preliminary candidate.

9 Claims, 8 Drawing Sheets

U.S. PATENT DOCUMENTS

| | | | |
|---|---|---|---|
| 5,795,306 A | 8/1998 | Shimotani et al. | |
| 6,130,617 A * | 10/2000 | Yeo | 340/575 |
| 6,243,015 B1 * | 6/2001 | Yeo | 340/576 |
| 6,304,187 B1 * | 10/2001 | Pirim | 340/576 |
| 6,535,223 B1 | 3/2003 | Foley | |
| 6,606,397 B1 | 8/2003 | Yamamoto | |
| 6,717,518 B1 | 4/2004 | Pirim et al. | |
| 6,885,760 B2 | 4/2005 | Yamada et al. | |
| 7,043,056 B2 | 5/2006 | Edwards et al. | |
| 7,203,340 B2 | 4/2007 | Gorodnichy | |
| 7,466,847 B2 | 12/2008 | Komura | |
| 7,689,010 B2 | 3/2010 | Canzler et al. | |
| 7,835,568 B2 | 11/2010 | Park et al. | |
| 7,894,637 B2 | 2/2011 | Noguchi et al. | |
| 8,150,205 B2 | 4/2012 | Watanabe | |
| 2001/0036298 A1 | 11/2001 | Yamada et al. | |
| 2003/0169907 A1 | 9/2003 | Edwards et al. | |
| 2004/0179716 A1 | 9/2004 | Tafuku et al. | |
| 2005/0199783 A1 | 9/2005 | Wenstrand et al. | |
| 2006/0045317 A1 | 3/2006 | Adachi et al. | |
| 2006/0203088 A1 | 9/2006 | Hammoud et al. | |
| 2006/0204042 A1 * | 9/2006 | Hammoud et al. | 382/107 |
| 2007/0153005 A1 | 7/2007 | Asai | |
| 2007/0172155 A1 | 7/2007 | Guckenberger | |
| 2007/0201724 A1 | 8/2007 | Steinberg et al. | |
| 2008/0137959 A1 | 6/2008 | Adachi et al. | |
| 2008/0151186 A1 | 6/2008 | Adachi et al. | |
| 2008/0212850 A1 | 9/2008 | Adachi et al. | |
| 2008/0226175 A1 | 9/2008 | Suzuki et al. | |
| 2008/0232650 A1 | 9/2008 | Suzuki et al. | |

FOREIGN PATENT DOCUMENTS

| | | |
|---|---|---|
| FR | 2784887 A1 | 4/2000 |
| JP | 3-202045 A | 9/1991 |
| JP | 7-181012 A | 7/1995 |
| JP | 7-313459 A | 12/1995 |
| JP | 8-101915 A | 4/1996 |
| JP | 10-44824 A | 2/1998 |
| JP | 10-63850 A | 3/1998 |
| JP | 11-066320 A | 3/1999 |
| JP | 2000-67225 A | 3/2000 |
| JP | 2000-123188 A | 4/2000 |
| JP | 2000-137792 A | 5/2000 |
| JP | 2000137792 A * | 5/2000 |
| JP | 2000-339457 A | 12/2000 |
| JP | 3143819 B2 | 1/2001 |
| JP | 2001-216515 A | 8/2001 |
| JP | 2001-307076 A | 11/2001 |
| JP | 3312562 A | 5/2002 |
| JP | 03-158643 A | 5/2003 |
| JP | 3444115 A | 6/2003 |
| JP | 2004-192552 A | 7/2004 |
| JP | 2004-220080 A | 8/2004 |
| JP | 2004-234494 A | 8/2004 |
| JP | 2005-25568 A | 1/2005 |
| JP | 2005-296349 A | 10/2005 |
| JP | 2006-65673 A | 3/2006 |
| WO | 00/24309 A1 | 5/2000 |
| WO | 2004/034905 A1 | 4/2004 |

OTHER PUBLICATIONS

Japanese Office Action issued in JP 2007-063149 dated Feb. 3, 2009 (14 pages).
Song, Xinguang, "Extraction of Facial Organ Features Using Partial Feature Template and Global Constraints," The IEICE Transactions of Institute of Information and Communication Engineers, Aug. 25, 1994, J77-D- II No. 8, pp. 1601-1609.
Chinesee Office Action issued in Chinese Application No. 200810005812X dated Mar. 23, 2011.
European Search Report dated Jul. 9, 2008.
Japanese Office Action issued in Japanese Application No. 2007-028822 dated Jun. 14, 2011.
Suzuki et al. "Development of a sensor detecting eyelid positions," The Society of Automotive Engineers of Japan, No. 51-08), (2008).
Adachi et al., "Development of a sensor detecting eyelid positions," 15th World Congress on ITS, No. 10102, (Nov. 16, 2008).
Kojima et al., "Development of a eyelid detection method," VIEW2008, (2008).
Nashina et al. "Development of a New Pre-Crash Safety System Using a Driver-Monitoring Sensor," The Society of Automotive Engineers of Japan, No. 51-08, (Apr. 3, 2006).
Nashina et al. "Development of a Pre-Crash Safety System Using Drivers Eyelid Positions Detection," 15th World Congress on ITS, No. 10315, (2008).

* cited by examiner

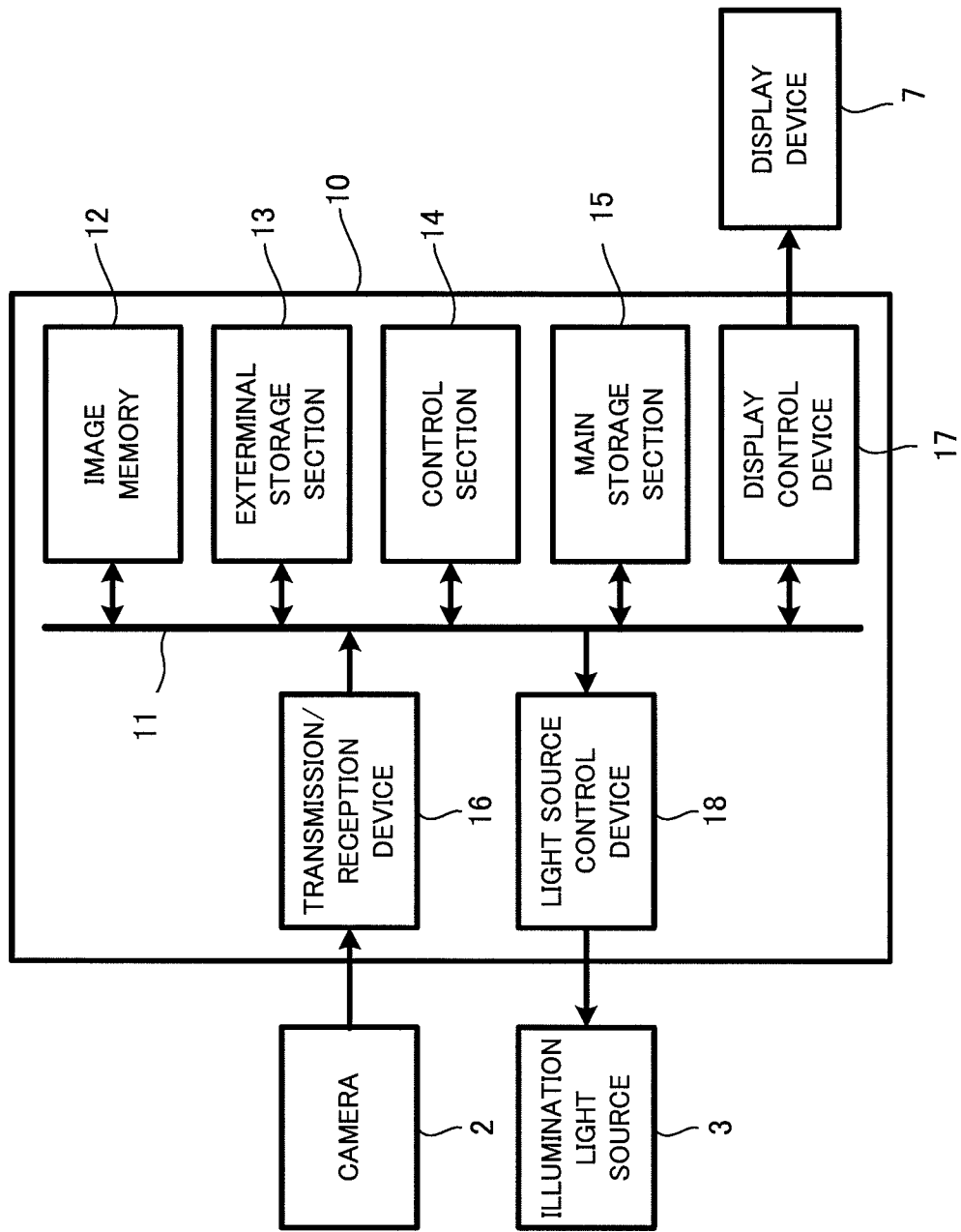

FIG. 4A
OPERATOR FOR
DETECTING HORIZONTAL
EDGE
| 1 | 0 | -1 |
|---|---|----|
| 2 | 0 | -2 |
| 1 | 0 | -1 |
FIG. 4B
OPERATOR FOR
DETECTING
VERTICAL
EDGE
| 1 | 2 | 1 |
|---|---|---|
| 0 | 0 | 0 |
| -1 | -2 | -1 |
FIG. 4C
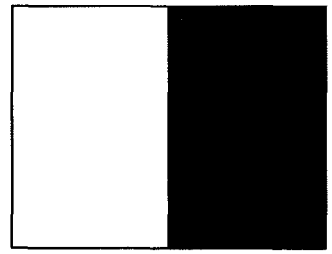
FIG. 4D
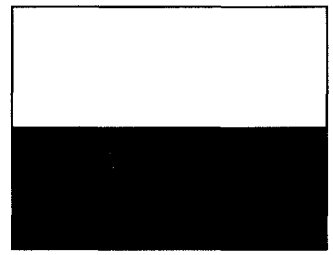

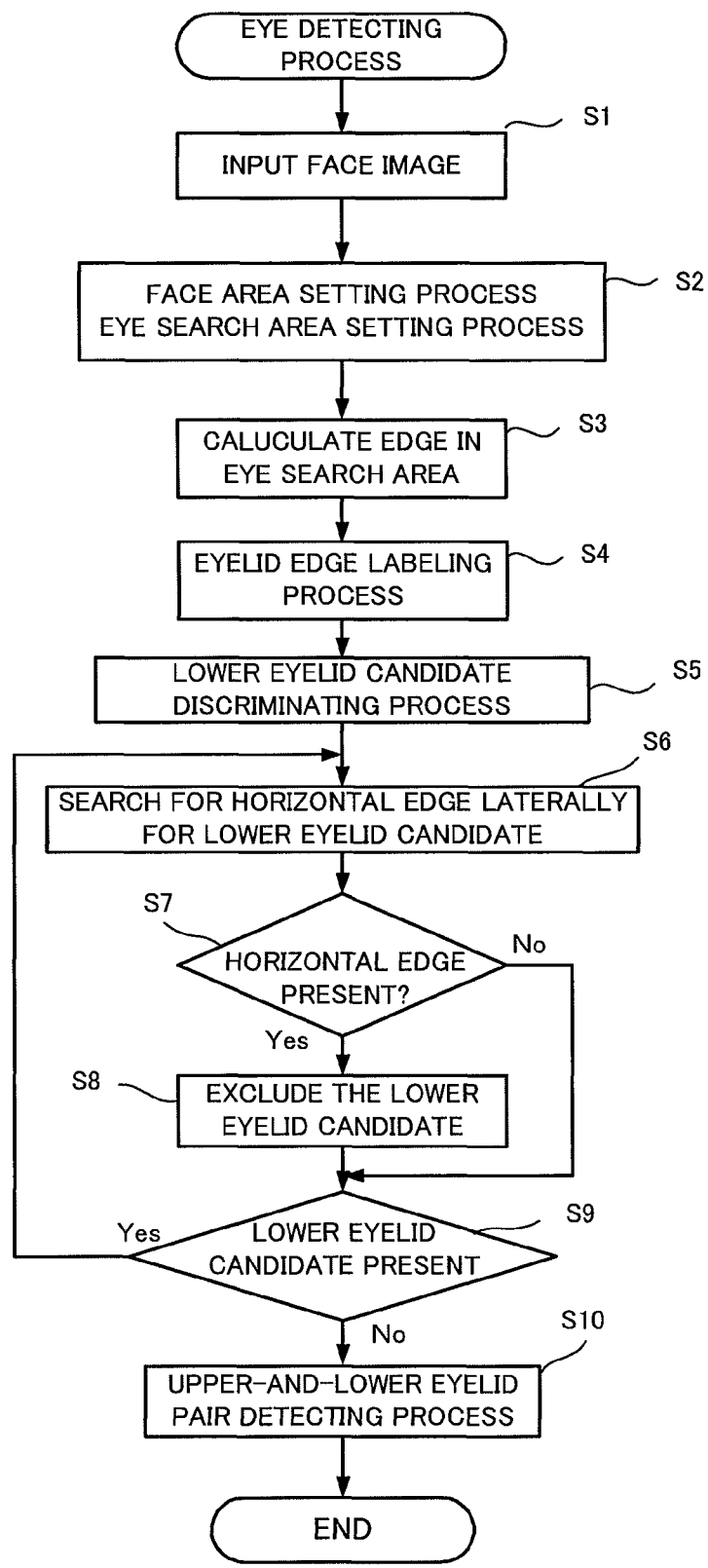

EYE DETECTING DEVICE, EYE DETECTING METHOD, AND PROGRAM

CROSS REFERENCE TO RELATED APPLICATION

This application is a National Stage of International Application No. PCT/JP2007/073311 filed Dec. 3, 2007, claiming priority based on Japanese Patent Application No. 2006-327430, filed Dec. 4, 2006, the contents of all of which are incorporated herein by reference in their entirety.

TECHNICAL FIELD

The present invention relates to an eye detecting device, an eye detecting method, and a program which detect an eye part in a face image.

BACKGROUND ART

There is a method of detecting the state of an eye based on a face image, and measuring the direction of the line of sight of the person to estimate the degree of vigilance of the person. In order to determine the state of an eye, it is necessary to detect an eye part of a face image accurately.

For example, an art of detecting an eye part in a face image is disclosed in Patent Literature 1. First, an upper edge which changes from light (white) to dark (black) color downward from above and a lower edge which changes from dark (black) to light (white) color downward from above are extracted from a face image. Next, a template is created based on an upper-and-lower edge pair, and candidates of an eye are detected through a correlation operation of this template and a face image. When two candidates, one above the other, with high correlation values are detected, they are assumed as an eyebrow and an eye, respectively, with the lower candidate being a candidate of an eye. When the eye candidate blinks, it is considered as a true eye, and the neighborhood area of the eye is stored as a tracking template.

Patent Literature 1: Unexamined Japanese Patent Application KOKAI Publication No. 2000-137792

DISCLOSURE OF INVENTION

Problem to be Solved by the Invention

In case of detecting the edge of an eyelid in a face image of a person who wears makeup, an extra edge similar to the edge of an eyelid is often detected in makeup portions, such as eye shadow or false eyelashes. When exposed to strong sunlight, edges may be detected in a deep shadow which is made under an upper eyelid or the like. If those edges are mistaken for edges formed by eyelids to erroneously detect a pair of upper and lower eyelids, it is not possible to accurately determine the state of an eye. In case of measuring the degree of opening/closing or blinking of an eye, especially, the erroneous detection of an upper and lower eyelids influences the measurement accuracy.

The present invention is made in view of the above problem, and it is an object of the invention to provide a device which accurately detects an eye part in a face image even when the face wears makeup or the like.

Means for Solving the Problem

To achieve the object, an eye detecting device according to a first aspect of the invention includes:

image acquiring means that acquires a face image;

eyelid candidate detecting means that detects a plurality of upper eyelid candidates which satisfy a predetermined condition for an upper eyelid and a plurality of lower eyelid candidates which satisfy a predetermined condition for a lower eyelid in the face image acquired by the image acquiring means; and eyelid determination means that compares a plurality of combinations of the upper eyelid candidates and lower eyelid candidates which are detected by the eyelid candidate detecting means to determine an upper eyelid candidate and a lower eyelid candidate which form a combination of the upper and lower eyelid candidates whose relation best satisfies a predetermined condition as an upper eyelid and a lower eyelid.

For example, the eye part detecting device may include storage means that stores positional relations between the upper eyelid candidates and the lower eyelid candidates which are detected by the eyelid candidate detecting means, and when the eyelid candidate detecting means newly detects the upper eyelid candidates and the lower eyelid candidates, the eyelid determination means may exclude a predetermined eyelid candidate from the upper eyelid candidates and the lower eyelid candidates based on the positional relations stored in the storage means.

For example, the eyelid candidate detecting means may include edge calculating means that calculates a horizontal direction edge which is a row of pixels whose luminance changes horizontally, and a vertical direction edge which is a row of pixels whose luminance changes vertically from the face image, and eyelid edge labeling means that classifies a plurality of horizontal edges and a plurality of vertical edges which are calculated by the edge calculating means according to a degree of how well a predetermined condition for the horizontal edge or vertical edge of the upper eyelid or the lower eyelid is satisfied to detect the upper eyelid candidate and the lower eyelid candidate.

For example, the eyelid determination means may include lower eyelid candidate evaluating means that excludes that of the lower eyelid candidates which has at least one horizontal edge present in a lateral direction thereof, and upper-and-lower eyelid pair determination means that discriminates a combination, which satisfies a predetermined upper and lower eyelid positional condition, of the combinations of the upper eyelid candidates and the lower eyelid candidates except that one or those ones having been excluded by the lower eyelid candidate evaluating means, and determines the discriminated combination as an upper-and-lower eyelid pair.

For example, the eyelid edge labeling means may include lower eyelid candidate discriminating means that classifies the lower eyelid candidates into lower eyelid candidates and lower eyelid preliminary candidates whose vertical direction edges do not satisfy the predetermined condition thereof, and the eyelid determination means may include lower eyelid candidate evaluating means that excludes that of the lower eyelid preliminary candidates classified by the lower eyelid candidate discriminating means in whose lateral direction the horizontal edge of at least one of the upper eyelid candidates exists, and upper-and-lower eyelid pair discriminating means that discriminates, as the upper-and-lower eyelid pair, a combination which satisfies the predetermined upper and lower eyelid positional condition among the combinations of the upper eyelid candidates and the lower eyelid candidates discriminated by the lower eyelid candidate discriminating means and those lower eyelid preliminary candidates which have not been excluded by the lower eyelid candidate evaluating means.

For example, the eyelid determination means may determine whether or not a number of the lower eyelid candidates detected by the eyelid candidate detecting means is equal to or less than a predetermined number, and the lower eyelid candidate evaluating means may not exclude the lower eyelid candidates wherein the eyelid determination means determines that the number is equal to or less than the predetermined number.

For example, the lower eyelid candidate discriminating means may calculate a length, a center of gravity, and a maximum point or minimum point of the vertical edge of the lower eyelid candidates, and classify the lower eyelid candidates into lower eyelid preliminary candidates and lower eyelid candidates based on at least one of a vertical distance between the center of gravity and the maximum point or minimum point and a ratio of the vertical distance to the length.

For example, the upper-and-lower eyelid pair discriminating means may calculate lengths and centers of gravity of the vertical edge of the upper eyelid candidates and the vertical edge of the lower eyelid candidates, and discriminate the upper-and-lower eyelid pair from the combinations of the upper eyelid candidates and the lower eyelid candidates based on at least one of an absolute value of a difference between the length of the vertical edge of the upper eyelid candidates and the length of the vertical edge of the lower eyelid candidates, a horizontal distance between the center of gravity of the vertical edge of the upper eyelid candidates and the center of gravity of the vertical edge of the lower eyelid candidates, and a distance between the center of gravity of the vertical edge of the upper eyelid candidates and the center of gravity of the vertical edge of the lower eyelid candidates.

To achieve the object, an eye detecting method according to a second aspect of the invention includes:

an eyelid candidate detecting step of detecting a plurality of upper eyelid candidates which satisfy a predetermined condition for an upper eyelid and a plurality of lower eyelid candidates which satisfy a predetermined condition for a lower eyelid in a face image; and an eyelid determination step of comparing a plurality of combinations of the upper eyelid candidates and the lower eyelid candidates which are detected by the eyelid candidate detecting means to discriminate an upper eyelid candidate and a lower eyelid candidate which form a combination of the upper and a lower eyelid candidates whose relation best satisfies a predetermined condition, and determining the discriminated upper eyelid candidate and lower eyelid candidate as an upper eyelid and a lower eyelid.

To achieve the object, a program according to a third aspect of the invention allows a computer to function as:

image acquiring means that acquires a face image;

eyelid candidate detecting means that detects a plurality of upper eyelid candidates which satisfy a predetermined condition for an upper eyelid and a plurality of lower eyelid candidates which satisfy a predetermined condition for a lower eyelid in the face image acquired by the image acquiring means; and eyelid determination means that compares a plurality of combinations of the upper eyelid candidates and lower eyelid candidates which are detected by the eyelid candidate detecting means to discriminate an upper eyelid candidate and a lower eyelid candidate which form a combination of the upper and lower eyelid candidates whose relation best satisfies a predetermined condition, and determines the discriminated upper eyelid candidate and lower eyelid candidate as an upper eyelid and a lower eyelid.

Effect of the Invention

According to the eye detecting device of the present invention, even when a confusing image similar to an eyelid exists at the peripheral portion of an eye, such as a person wearing makeup like an eye shadow or a false eyelash, or a deep shadow produced near an eye by sunlight or the like, the eye can be detected accurately.

BRIEF DESCRIPTION OF DRAWINGS

FIG. 3 is a block diagram showing the configuration of a computer shown in FIG. 1.

FIG. 4A is a diagram showing an example of an operator for vertical edge detection.

FIG. 4B is a diagram showing an example of an operator for horizontal edge detection.

FIG. 4C is a diagram showing an example of sequential shading differences in a vertical direction.

FIG. 4D is a diagram showing an example of sequential shading differences in a horizontal direction.

FIG. 11 is a flowchart illustrating an example of the operation of the eye detecting device.

Figure 1:
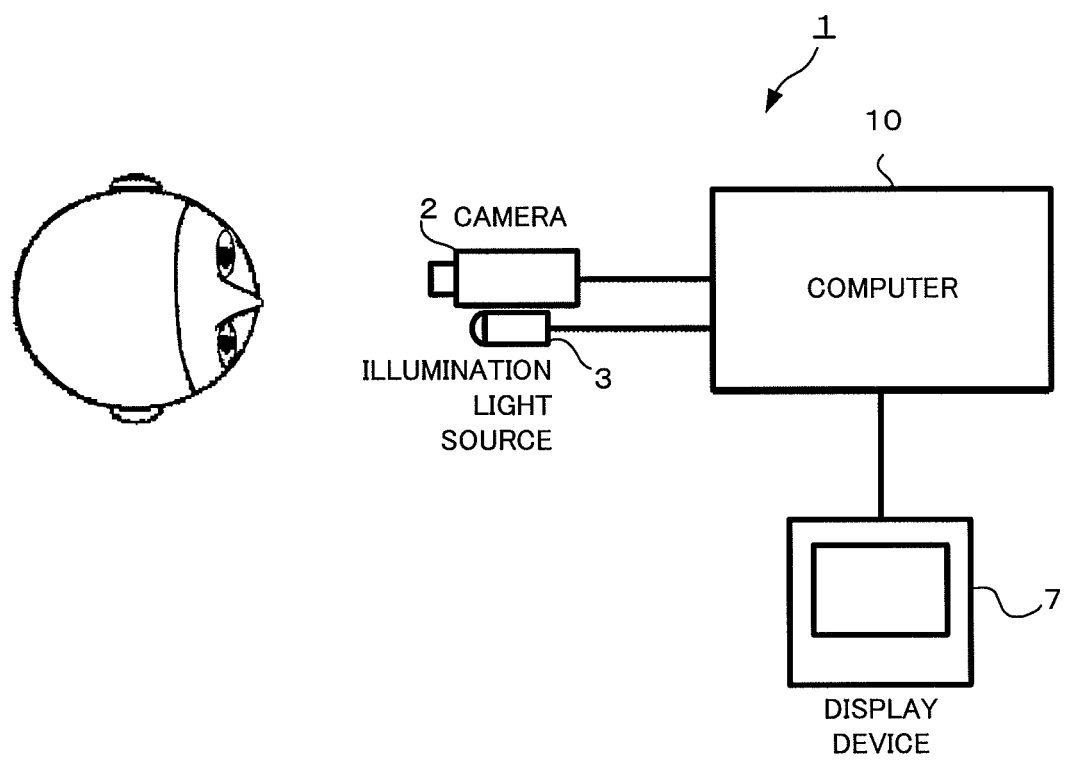
FIG. 1 is a block diagram of an eye detecting device according to an embodiment of the present invention.

DESCRIPTION OF REFERENCE NUMERALS 1 eye detecting device
2 camera (image acquiring means)
5 data holding section (storage means)
10 computer
12 image memory
13 external storage section
14 control section (image acquiring means, eyelid candidate detecting means, eyelid determination means, edge calculating means, eyelid edge labeling means, lower eyelid candidate evaluating means, upper-and-lower eyelid pair discriminating means, lower eyelid candidate discriminating means)
15 main storage section
16 transmission/reception device (image acquiring means)
21 image input section 22 eye search area setting section
23 edge calculating section (edge calculating means)
24 eyelid edge labeling section (eyelid edge labeling means)
25 lower eyelid candidate discriminating section (lower eyelid candidate discriminating means)
26 lower eyelid candidate evaluating section (lower eyelid candidate evaluating means)
27 eyelid determination section (upper-and-lower eyelid pair determination means)
51 face image data
52 face area and eye search area data
53 horizontal/vertical edge data
54 eyelid candidate and lower eyelid preliminary candidate data
55 eyelid data
56 positional relation data

BEST MODE FOR CARRYING OUT THE INVENTION

Referring to the accompanying drawings, the following will describe an embodiment of the invention in detail. Identical reference numerals are given to identical or corresponding portions in the diagrams.

As shown in FIG. 1, an eye detecting device 1 according to the embodiment includes a camera 2 which photographs the face of a driver to generate a face image, an illumination light source 3 which illuminates the driver's face, a computer 10 which detects an eye part of the driver, and a display device 7 connected to the computer 10. The display device 7 is not an essential component, and need not be particularly provided if it is unnecessary to display a face image, a detection result, a determination result, etc.

The camera 2 converts an image formed by its lens into an electrical signal by a CCD (Charge Coupled Device) or the like, and outputs image data digitized for every pixel. The camera 2 acquires a gradation image of the face of the driver, for example. The image data generated by the camera 2 includes not only the driver's face but also the background thereof.

The display device 7 comprises an LCD (Liquid Crystal Display), CRT (Cathode Ray Tube) or the like, and displays a binarized image or so generated from the face image photographed by the camera 2.

The computer 10 processes the image data acquired by the camera 2, and detects both right and left end positions, and top and bottom positions of a face. Based on the detected right and left end positions and top and bottom positions, an area where an eye part is to be searched (eye part search area) is set. Then, upper and lower eyelids in the eye part search area are detected.

Figure 2:
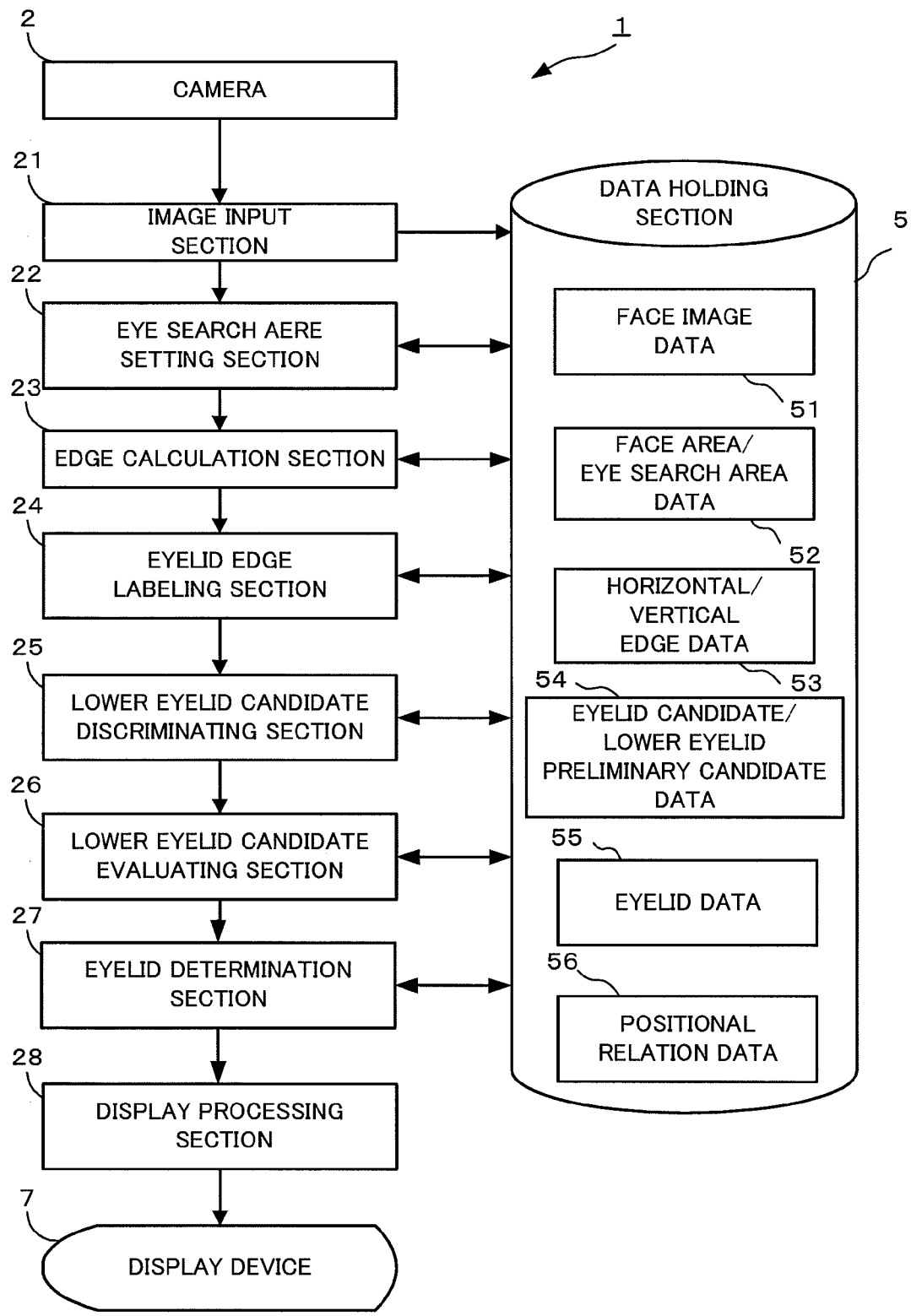
FIG. 2 is a block diagram showing the logical configuration of the eye detecting device which is one of the embodiments of the present invention.

FIG. 2 shows the logical configuration of the eye part detecting device 1 which is one embodiment of the invention. The eye detecting device 1 includes the camera 2, an image input section 21, an eye search area setting section 22, an edge calculating section 23, an eyelid edge labeling section 24, a lower eyelid candidate discriminating section 25, a lower eyelid candidate evaluating section 26, an eyelid determination section 27, a display processing section 28, a data holding section 5, and the display device 7. The data holding section 5 stores and holds face image data 51, face area/eye search area data 52, horizontal/vertical edge data 53, eyelid candidate and bottom eyelid preliminary candidate data 54, eyelid data 55, and positional relation data 56. The eye detecting device 1 detects a pair of the upper eyelid and the lower eyelid of an eye part in the face image.

FIG. 3 shows an example of the physical configuration of the eye detecting device 1. The computer 10 includes a transmission/reception device 16, an image memory 12, an external storage section 13, a control section 14, a main storage section 15, a display control device, and a light source control device 18 as shown in FIG. 3. The image memory 12, the external storage section 13, the main storage section 15, the transmission/reception device 16, the display control device 17, and the light source control device 18 are connected to the control section 14 via an internal bus 11.

The control section 14 comprises a CPU (Central Processing Unit) and other elements, and executes processes of the image input section 21, the eye search area setting section 22, the edge calculating section 23, the eyelid edge labeling section 24, the lower eyelid candidate discriminating section 25, the lower eyelid candidate evaluating section 26, the eyelid determination section 27, and the display processing section 28 according to a program stored in the external storage section 13.

The image input section 21, the eye search area setting section 22, the edge calculating section 23, the eyelid edge labeling section 24, the lower eyelid candidate discriminating section 25, the lower eyelid candidate evaluating section 26, the eyelid determination section 27, and the display processing section 28 are realized by the control section 14 and the program which is executed thereon.

The main storage section 15 comprises an RAM (Random-Access Memory) or the like, and is used as a workspace for the control section 14. The data holding section 5 is stored and held as a structure of a storage area in a part of the image memory 12 and the main storage section 15.

The external storage section 13 comprises a nonvolatile memory, such as a flash memory, a hard disk, a DVD (Digital Versatile Disc), a DVD-RAM (Digital Versatile Disc Random-Access Memory) or a DVD-RW (Digital Versatile Disc ReWritable), and prestores a program for allowing the control section 14 to execute the aforementioned processing. The external storage section 13 provides the control section 14 with data of this program according to an instruction from the control section 14, and stores the data supplied from the control section 14. For example, there is a case where time-sequential image data is stored in the external storage section 13.

The transmission/reception device 16 includes a modem or a network terminal unit, and a serial interface, or an LAN (Local Area Network) interface or an NTSC interface linked thereto. The control section 14 inputs image data from the camera 2 via the transmission/reception device 16. The image memory 12 stores image data generated by the camera 2 and inputted via the transmission/reception device 16.

The display control device 17 controls the display device 7 under the control of the control section 14.

The light source control device 18 controls the turning ON and OFF of the illumination light source 3.

The control section 14 executes the program stored in the external storage section 13 to process the image data acquired by the camera 2, thereby detecting both end positions and the top and bottom positions of a face. The control section 14 detects candidates of the upper and lower eyelids in the eye part search area based on the detected both end positions and top and bottom positions, and determines those of the candidates which best satisfy conditions for the upper and lower eyelids as an upper-and-lower eyelid pair.

Returning to FIG. 2, the operation of each section of the eye detecting device 1 is explained. The camera 2 photographs the image of a face. The image input section 21 inputs time-sequential image data from the camera 2 with a given time interval, and stores the image data as face image data 51 in the data holding section 5.

The eye search area setting section 22 extracts a face area from the face image data 51, and sets up an eye search area in the face area. Methods of extracting a face area include, for example, a method of calculating the edge of a face outline from a face image or a method of extracting a face outline by pattern satisfying of the face outline.

Figure 5:
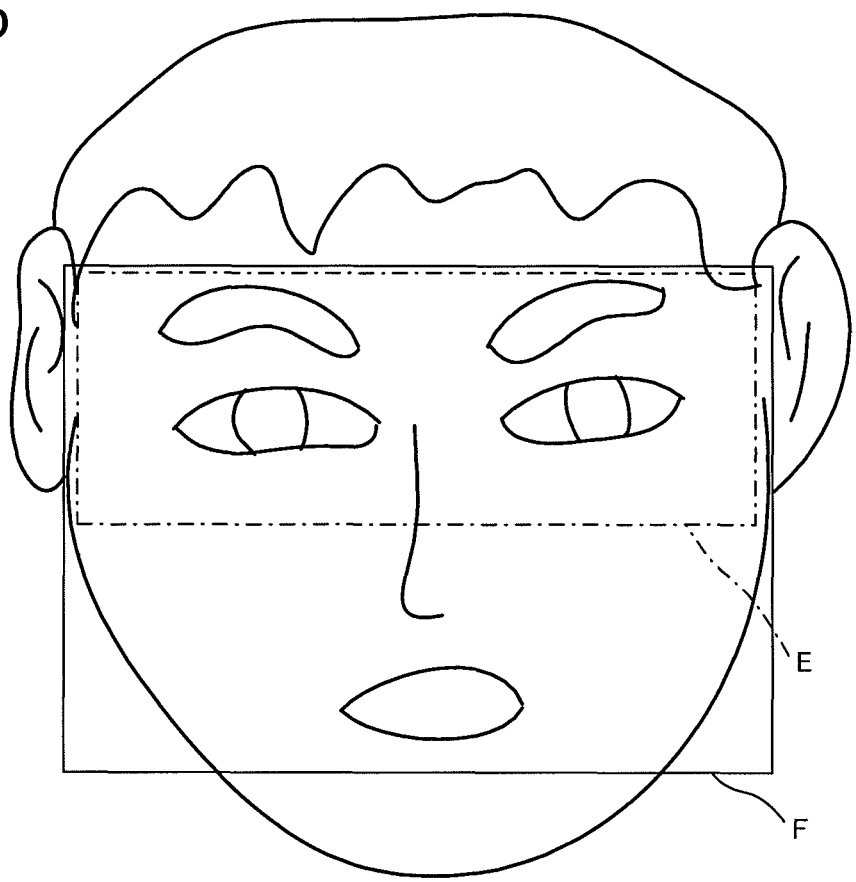
FIG. 5 is a diagram showing an example of data which specifies the area of a face image.

The eye search area setting section 22 sets a face area by detecting the edge of an eyebrow from the upper portion within the outline of the face, and the lower edge of a mouth from the lower portion of the range. Then, for example, an eye search area is set in the face area at a ratio based on statistical data. FIG. 5 shows an example of a face area F and an eye search area E. The eye search area setting section 22 stores the set face area F and eye search area E in the data holding section 5 as the face area/eye search area data 52.

At the time of setting the eye search area E, the eye search area setting section 22 may detect a feature portion which is easy to detect, e.g., a nostril, and set the eye search area E based on the position of the nostril. In addition, for example, the eye search area E can be set by setting a length, obtained by multiplying the distance from the top of the nostril to an eyebrow by a predetermined ratio, and a length obtained by multiplying the width of the face outline by a predetermined ratio in a center of the face outline. With the eye search area E set, the eye detecting device 1 can improve the efficiency of detecting an eye part.

FIG. 4A through FIG. 4D show diagrams illustrating an example of fixed data for edge calculation. The external storage section 13 stores operators of Sobel filters for detection of a horizontal edge and for detection of a vertical edge as shown in FIG. 4A and FIG. 4B.

According to the present invention, a sequence of points in an image whose luminance changes from light to dark color, or from dark to light color in the horizontal direction is called a horizontal edge. Since the points forming a horizontal edge are substantially sequential in the longitudinal direction, they are also called a longitudinal edge. A sequence of points whose luminance changes from light to dark color, or from dark to light color in the vertical direction is called a vertical edge. Since the points forming a vertical edge are substantially sequential in the lateral direction, they are also called a lateral edge.

The Sobel filter for detection of a horizontal edge (longitudinal edge) shown in FIG. 4A is the operator for extracting the boundary (edge) of the shading differences which are sequential in the longitudinal direction as shown in FIG. 4C. The Sobel filter for detection of a vertical edge (lateral edge) shown in FIG. 4B is the operator for extracting the boundary (edge) of the shading differences which are sequential in the lateral direction as shown in FIG. 4D.

As shown in FIG. 5, the external storage section 13 stores data which specifies the range F of a face among the face images stored in the main storage section 15, and data which specifies the eye search area E where it is assumed that images of eyes or eyebrows exist.

Figure 6:
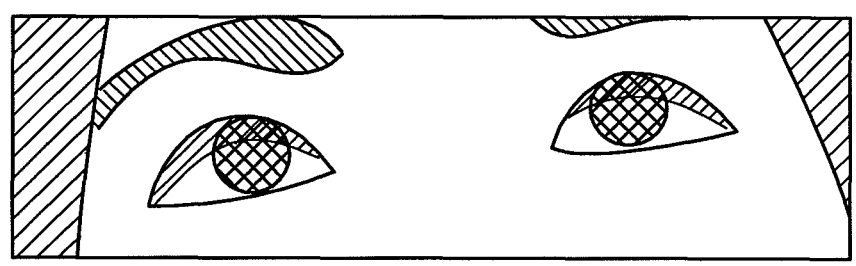
FIG. 6 is a diagram exemplarily showing an example of an original image of an eye search area.
Figure 7A:
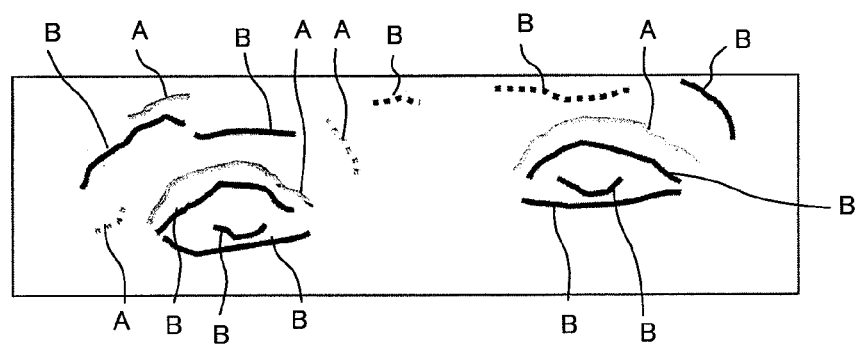
FIG. 7A is a diagram showing an example of detection of a vertical edge in the eye search area.

The edge calculating section 23 calculates a horizontal edge and a vertical edge from the eye search area E using the filters shown in, for example, FIG. 4A and FIG. 4B. FIG. 6 shows an exemplary example of the original image of the eye search area E. Dark areas of the image are shown hatched in FIG. 6. FIG. 6 shows a case where the shadows of the upper eyelids are produced as an example. FIG. 7A shows an example of the vertical edge calculated from the original image of the eye search area E. FIG. 7 B shows an example of the horizontal edge calculated from the original image of the eye search area E.

In FIG. 7A, points which change from light to dark color downward from above are represented by a lateral minus edge A and points which change from dark to light color downward from above are represented by a lateral plus edge B. Main portions of the lateral minus edge A become upper eyelid candidates. Main portions of the lateral plus edge B become lower eyelid candidates. In addition, the upper and lower edges of an eyebrow, the lower edge of the shadow of an upper eyelid (or eye shadow), the lower edge of the iris, etc. are calculated as vertical edges.

Figure 7B:
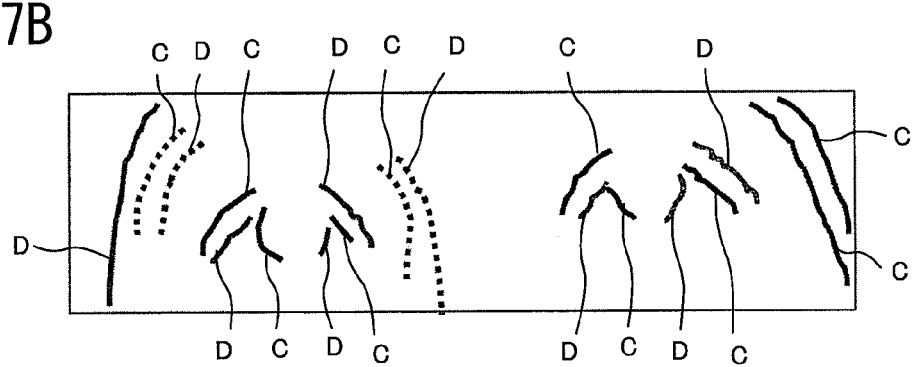
FIG. 7B is a diagram showing an example of detection of a horizontal edge in the eye search area.
Figure 7C:
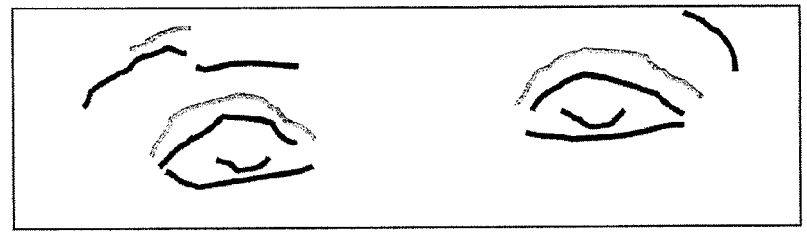
FIG. 7C is a diagram showing the result of removing a short edge from the vertical edge in FIG. 7A.
Figure 7D:
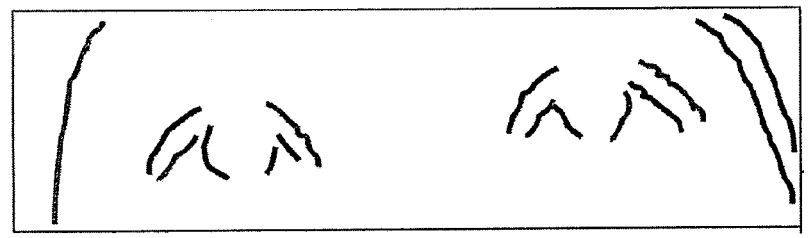
FIG. 7D is a diagram showing the result of removing a short edge from the horizontal edge in FIG. 7B.

In FIG. 7B, points which change from light to dark color rightward from the left are represented by a longitudinal minus edge C, and points which change from dark to light color rightward from the left are represented by a longitudinal plus edge D. Because longitudinal edges (horizontal edge) appear at both ends of the upper eyelid, the upper eyelid substantially comprises the longitudinal minus edge C, the lateral minus edge A, and the longitudinal plus edge D, from the left. Although the lateral plus edge B (vertical edge) appears at the lower eyelid, a longitudinal edge (horizontal edge) rarely appears. In FIG. 7B, since the eye search area E is taken wider laterally, the outline of the face also appears as a longitudinal edge. In addition, the shadow of an eye socket, the shadow of an upper eyelid (or eye shadow), the lateral edges of the iris, etc. are calculated as horizontal edges.

The edge calculating section 23 stores the calculated horizontal edge and the vertical edge in the data holding section 5 as the horizontal/vertical edge data 53.

The eyelid edge labeling section 24 groups a sequence of points which is longer than a predetermined length from the horizontal/vertical edge data 53, as an edge. When the edge formed by the sequential points has a predetermined length or a shorter length, the eyelid edge labeling section 24 deletes the edge.

FIG. 7 C shows the result of performing an eyelid edge labeling process on the vertical edge in FIG. 7A. FIG. 7 D shows the result of performing an eyelid edge labeling process on the horizontal edge in FIG. 7B. In FIG. 7C and FIG. 7D, short edges are deleted. In data, sequential points are labeled as a collection of edges.

The eyelid edge labeling section 24 regards, among the grouped edges, a lateral minus edge A as an upper eyelid candidate. The eyelid edge labeling section 24 also treats a lateral plus edge B as a lower eyelid candidate. The eyelid edge labeling section 24 regards a longitudinal minus edge C among the horizontal edges which is near the left portion of the lateral minus edge A (upper eyelid candidate) as a part of the upper eyelid candidate. The eyelid edge labeling section 24 regards, among the horizontal edges, a longitudinal plus edge D which is near the right portion of the lateral minus edge A (upper eyelid candidate) as a part of the upper eyelid candidate. In this manner, that edge which has the longitudinal minus edge C and the longitudinal plus edge D present on both sides of the lateral minus edge A can be treated as an upper eyelid candidate with a high accuracy.

Figure 8:
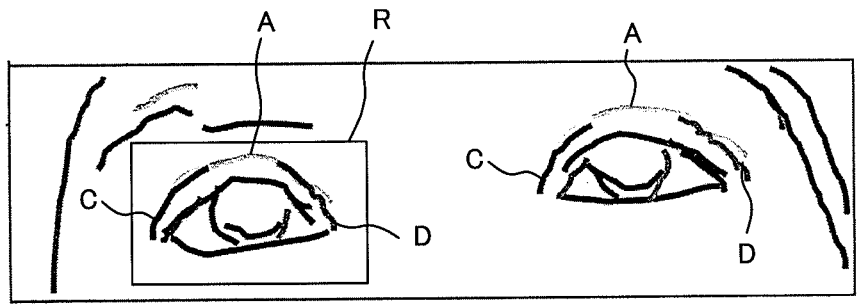
FIG. 8 is a diagram showing the vertical edge and the horizontal edge overlying each other.

FIG. 8 presents a diagram which shows the vertical edge and the horizontal edge of the results of executing the eyelid edge labeling process, overlying each other. It is shown that the lateral minus edge A which has the longitudinal minus edge C and the longitudinal plus edge D present on both sides thereof is a probable upper eyelid candidate.

The eyelid edge labeling section 24 performs continuous edge detection, and calculates the length of an edge and the position of the center of gravity. The eyelid edge labeling section 24 stores the data of the edge, which is subjected to the labeling process, in the data holding section 5 as the eyelid candidate data 54.

Based on the shape condition of the lower eyelid, the lower eyelid candidate discriminating section 25 discriminates a lower eyelid preliminary candidate from the lateral plus edges B which are lower eyelid candidates. The lower eyelid candidate discriminating section 25 stores data of the discriminated lower eyelid preliminary candidate and a remaining lower eyelid candidates other than the lower eyelid preliminary candidate in the eyelid candidate data 54.

For example, the edges under the eye shadow or the shadow of an upper eyelid, like those of a lower eyelid, appear as the lateral plus edges B. It is to be noted that the lateral plus edges B other than those of the lower eyelid have a curved shape like the upper part of an ellipse.

Then, based on the edge shape, the lower eyelid candidate discriminating section 25 discriminates that of the lower eyelid candidates which is not likely to be evaluated as a probable lower eyelid and a lower eyelid preliminary candidate which is doubtful as a lower eyelid.

First, the lower eyelid candidate discriminating section 25 calculates the maximum point and minimum point of the lateral plus edge B. Then, the lower eyelid candidate discriminating section 25 leaves that of the lateral plus edges B, the vertical distance between whose center of gravity and the maximum point or minimum point is equal to or less than a predetermined length, as a lower eyelid candidate. Next, the lower eyelid candidate discriminating section 25 discriminates that of the lateral plus edges B the vertical distance between whose center of gravity and the maximum point or minimum point is longer than the predetermined length, as a lower eyelid preliminary candidate which is doubtful as a lower eyelid candidate.

When discriminating a lower eyelid preliminary candidate, the ratio of the vertical distance from the center of gravity to the maximum point or minimum point to the length of the plus edge B may be used as a reference for determination.

Figure 9:
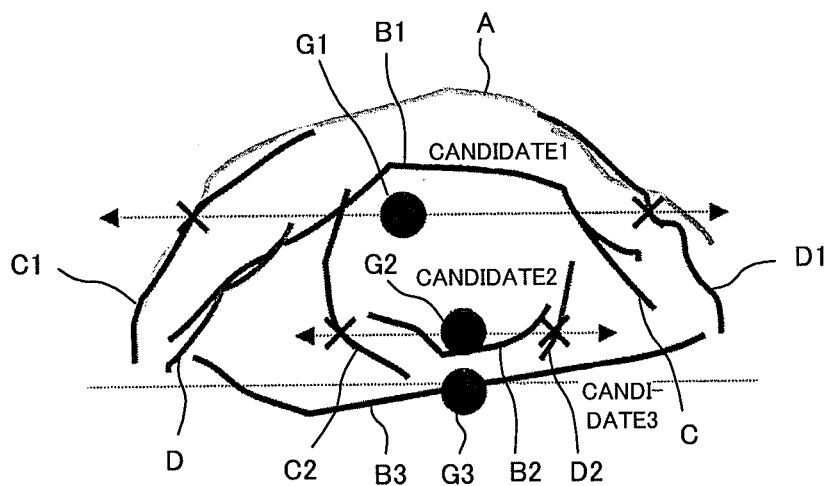
FIG. 9 is a diagram showing a portion R in FIG. 8 in enlargement.

FIG. 9 shows a portion R in FIG. 8 in enlargement. Lateral plus edges B1, B2, and B3 shown in FIG. 9 are lower eyelid candidates. For the lateral plus edges B1, B2, and B3, the centers of gravity G1, G2, and G3 are shown, respectively. With regard to the lateral plus edge B1, the vertical distance between the center of gravity G1 and the maximum point is large (curved upward), the lower eyelid candidate discriminating section 25 discriminates the lateral plus edge B1 as a lower eyelid preliminary candidate. With regard to the lateral plus edge B2, the ratio of the vertical distance between the center of gravity G2 and the minimum point to the length of the edge is large (curved downward), the lower eyelid candidate discriminating section 25 discriminates the lateral plus edge B2 as a lower eyelid preliminary candidate. With regard to the lateral plus edge B3, the vertical distance between the center of gravity G3 and the minimum point is smaller than the length of the edge (curvature is small), the lower eyelid candidate discriminating section 25 leaves the lateral plus edge B3 as a lower eyelid candidate.

Next, the lower eyelid candidate evaluating section 26 evaluates the probability of the lower eyelid preliminary candidate discriminated by the lower eyelid candidate discriminating section 25 as a lower eyelid according to the condition of the lower eyelid preliminary candidate with a horizontal edge. That is, the lower eyelid candidate evaluating section 26 excludes a lower eyelid preliminary candidate which has a horizontal edge present in a predetermined lateral range from the lower eyelid preliminary candidates.

For example, referring to FIG. 9, the probability of the lateral plus edge B1 which is a lower eyelid preliminary candidate as a lower eyelid is evaluated. The lower eyelid candidate evaluating section 26 performs lateral searching from the center of gravity G1 of the lateral plus edge B1. Then, there are the longitudinal minus edge C1 and the longitudinal plus edge D1, so that the lower eyelid candidate evaluating section 26 excludes the lateral minus edge B1 from the lower eyelid candidates. The lower eyelid candidate evaluating section 26 also performs lateral searching from the center of gravity G2 of the lateral plus edge B2. Then, there are the longitudinal minus edge C2 and the longitudinal plus edge D2, so that the lower eyelid candidate evaluating section 26 also excludes the lateral plus edge B2 from the lower eyelid preliminary candidates. Because a longitudinal edge (horizontal edge) is not found within the predetermined range even through the lateral searching from the center of gravity G3 of the lateral plus edge B3, the lower eyelid candidate evaluating section 26 leaves the lateral plus edge B3 as a lower eyelid candidate.

The predetermined range where the lower eyelid candidate evaluating section 26 performs searches for horizontal edges extends, for example, by the length of the lateral plus edge which is a lower eyelid preliminary candidate to both lateral sides from the center of the edge.

In addition, the lower eyelid candidate evaluating section 26 searches for horizontal edges for both a lower eyelid preliminary candidate and a lower eyelid candidate. However, for example, the lower eyelid candidate evaluating section 26 may make evaluation only on the lower eyelid preliminary candidate discriminated by the lower eyelid candidate discriminating section 25. Then, the lower eyelid candidate evaluating section 26 need not make evaluation on the lower eyelid candidate, thus improving the processing speed of the eye detecting device 1.

The lateral plus edge B1 is the lower edge of the shadow of an upper eyelid. The lateral plus edge B2 is the lower edge of a pupil, and the longitudinal minus edge C2 and the longitudinal plus edge D2 are the edges of the iris. It is to be noted that the lateral plus edge B1 can likewise be excluded even if it is the lower edge of an eye shadow.

As described above, it is possible to discriminate lower eyelid candidates and discriminate a most probable lower eyelid candidate by setting the difference between the feature of a lower eyelid and the feature of a shadow, makeup or the iris, as a specific condition, and making evaluation based on the condition.

The eye detecting device 1 needs not perform discrimination of lower eyelid candidates. In this case, the lower eyelid candidate evaluating section 26 evaluates the probability of every lower eyelid candidate as a lower eyelid according to the condition of combination with the horizontal edge. When there are a few lower eyelid candidates, the amount of processing on evaluation on lower eyelid candidates does not become large even if discrimination of lower eyelid candidates is not carried out, so that there is a low possibility of a detection error.

That is, when the number of lower eyelid candidates detected is equal to or less than a predetermined value, the processing speed of the eye detecting device 1 can be increased by skipping the discrimination of lower eyelid candidates (exclusion of a lower eyelid candidate) by the lower eyelid candidate evaluating section 26. When the number of lower eyelid candidates detected exceeds the predetermined value, on the other hand, the processing speed of the eye detecting device 1 can be increased by executing the discrimination of lower eyelid candidates (exclusion of a lower eyelid candidate) by the lower eyelid candidate evaluating section 26.

Alternatively, the lower eyelid candidate evaluating section 26 may evaluate the probability of only a lower eyelid preliminary candidate as a lower eyelid under the condition of combination with a horizontal edge. In this case, the evaluation of the probability of lower eyelid candidates other than the lower eyelid preliminary candidates as a lower eyelid is not carried out under the condition of combination with a horizontal edge. Although the lower eyelid candidate discriminating section 25 performs discrimination according to the shape condition, however, the probability of selecting an erroneous lower eyelid in later detection is small. Simplification of the evaluation of a lower eyelid can reduce the amount of processing of the eye detecting device 1.

The eyelid determination section 27 takes, as upper and lower eyelids, that of combinations of the upper eyelids and the lower eyelid candidates and lower eyelid preliminary candidates having remained last which best satisfies the condition for the upper and lower eyelids taken as a pair. For example, the eyelid determination section 27 makes detection based on the length of lateral minus edge satisfying with the length of the lateral plus edge, the lateral positions of the edge centers of gravity of the pair of the upper and lower eyelids being aligned with each other, and the distance between the edge centers of gravity falling within a predetermined range.

Specifically, the eyelid determination section 27 leaves a combination of the lateral minus edge A and the lateral plus edge B which satisfy the condition $$|Lm-Lp|<Lt$$

where Lm is the length of the lateral minus edge A, Lp is the length of the lateral plus edge B, and Lt is a threshold.

In addition, the eyelid determination section 27 leaves a combination of the lateral minus edge A and the lateral plus edge B which satisfy the condition $$|Xm-Xp|<Xt$$

where Xm is the X coordinate of the center of gravity of the lateral minus edge A, Xp is the X coordinate of the center of gravity of the lateral plus edge B, and Xt is a threshold.

Further, the eyelid determination section 27 leaves a combination of the lateral minus edge A and the lateral plus edge B which satisfy the condition $$(Xm-Xp)^2+(Ym-Yp)^2<Dt$$

where Ym is the Y coordinate of the center of gravity of the lateral minus edge A, Yp is the Y coordinate of the center of gravity of the lateral plus edge B, and Dt is a threshold.

The eyelid determination section 27 selects, as an upper-and-lower eyelid pair, that of the remaining combinations which is appropriate as, for example, right and left eyes and which has the closest lateral positions of the centers of gravity of each of them.

Figure 10:
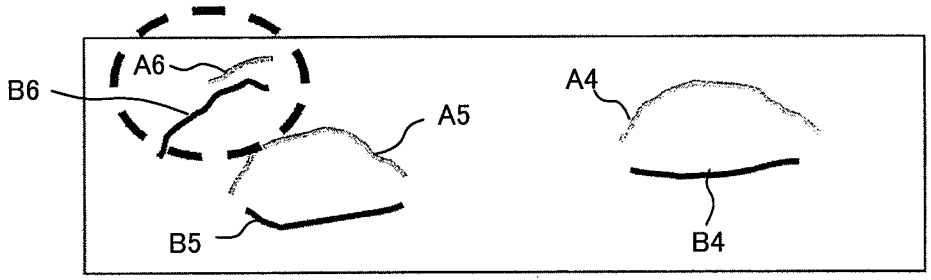
FIG. 10 is a diagram illustrating how to select an upper-and-lower eyelid pair.

FIG. 10 presents a diagram illustrating how to select an upper and lower eyelid pair. The eyelid determination section 27 creates combinations of upper and lower eyelids which are formed by the lateral minus edges A4, A5 and A6, and the lateral plus edges B4, B5 and B6 which have remained as the result of evaluating lower eyelid candidates. If a selection is made by the above-described method, a set of the lateral minus edge A4 and the lateral plus edge B4, and a set of the lateral minus edge A5 and the lateral plus edge B5 are selected as an upper-and-lower eyelid pair. The lateral minus edge A6 and lateral plus edge B6 which are encircled by a broken-line ellipse cannot be combined as an upper-and-lower eyelid pair due to the condition of the lengths of the edges and/or the lateral positions of the centers of gravity of the edges. The eyelid determination section 27 stores data of the upper and lower eyelid candidates detected as a pair of the upper and lower eyelids in the data holding section 5 as the eyelid data 55.

Further, the eyelid determination section 27 stores the positions of the lateral minus edge A6 and the lateral plus edge B6 (upper eyelid candidate and lower eyelid candidate) which have not been detected as an upper-and-lower eyelid pair, as the positional relation data 56, in the data holding section 5 in FIG. 10. The eyelid determination section 27 may store the positional relation between the lateral minus edge A6 and the lateral plus edge B6 (upper eyelid candidate and lower eyelid candidate) as the positional relation data 56 in the data holding section 5. In addition, the eyelid determination section 27 may store the positional relation between the lateral minus edge A6 and the lateral plus edge B6 (upper eyelid candidate and lower eyelid candidate) and the lateral minus edges A4, A5 and the lateral plus edges B4, B5 as the positional relation data 56 in the data holding section 5.

When the eyelid edge labeling section 24 stores edge data as the eyelid candidate data 54 in the data holding section 5 again, the eyelid determination section 27 discriminates whether or not data of edges corresponding to the eyelid candidate (lateral minus edge A6 and lateral plus edge B6) excluded from the upper-and-lower eyelid pair in the previous detection as the eyelid candidate data 54 based on the positional relation data 56. As a result, as long as data of the edges corresponding to the lateral minus edge A6 and the edge lateral plus edge B6 is stored as the eyelid candidate data 54, the eyelid determination section 27 may exclude the data of the edges from eyelid candidate data.

Accordingly, the eyelid candidates with the positional relation as shown in FIG. 10 remain in the previous processing, and the edges A6 and B6 are excluded from the upper-and-lower eyelid pair finally. Therefore, the eyelid determination section 27 can exclude the eyelid candidates at the positions corresponding to the edges A6 and B6 without evaluating them in the next processing. The eye detecting device 1 can therefore shorten the eyelid detecting process.

The display processing section 28 displays the upper and lower eyelids as the detected results on the display device 7 together with the outline of the face or the like. The eye detecting device 1 may detect the degree of opening/closing of the eye from the upper and lower eyelids. When the eye detecting device 1 presumes the vigilance of the driver from the degree of opening/closing of the upper and lower eyelids and detects it as a nap, the eye detecting device 1 may display a warning on the display device 7 (including a sound or the like). Further, upper and lower eyelid data can also be used in presuming the direction of the line of sight.

The operation of the eye detecting device 1 is explained next. The control section 14 cooperates with the camera 2, the transmission/reception device 16, the image memory 12, the external storage section 13, and the main storage section 15 to carry out the operation of the eye detecting device 1.

FIG. 11 is a flowchart illustrating an example of the operation of the eye detecting device 1. The control section 14 inputs a face image from the camera 2 via the transmission/reception device 16 (step S1). As described above, the control section 14 sets a face area, and sets an eye search area in the face area (step S2).

The control section 14 calculates horizontal edges and vertical edges within the set eye search area (step S3). For the calculated horizontal edges and vertical edges, the control section 14 performs the eyelid edge labeling processing, such as grouping a sequence of points of a predetermined length or longer as an edge (step S4). The control section 14 also calculates the lengths of the edges and the positions of the centers of gravity thereof. Further, the control section 14 performs the lower eyelid candidate discriminating process of making discrimination according to the shape condition of a lower eyelid among the lateral plus edges B as lower eyelid candidates (step S5).

Next, the control section 14 makes searching to determine whether or not there is any horizontal edge laterally for each lower eyelid candidate (step S6). If a horizontal edge is in the predetermined range (step S7; Yes), the control section 14 excludes the lower eyelid candidate (step S8). If a horizontal edge is not in the predetermined range (step S7; No), the control section 14 leaves the lower eyelid candidate.

If there is a further lower eyelid candidate (step S9; Yes), the control section 14 makes searching to determine whether or not there is any horizontal edge laterally (step S6), and discriminates whether to exclude or leave the lower eyelid candidate (step S7 and S8).

If there is no further lower eyelid candidate (step S9; No), the control section 14 selects that of the combinations of upper-and-lower eyelid pairs comprising the remaining upper eyelid candidates and lower eyelid candidates (and lower eyelid preliminary candidates) which best satisfies a predetermined condition, e.g., the aforementioned condition (step S10).

According to the eye detecting device 1 of the invention, even when a confusing image similar to an eyelid exists at the peripheral portion of an eye, such as a person wearing makeup like an eye shadow and a false eyelash, or a deep shadow produced near an eye by sunlight or the like, the eye can be detected in face image data accurately.

In addition, the foregoing hardware configuration and flowcharts are merely illustrative, and may be modified and corrected arbitrarily.

The core part which executes the processing of the eye detecting device 1 comprising the control section 14, the transmission/reception device 16, the image memory 12, the external storage section 13, the main storage section 15, etc. can be realized using an ordinary computer system, not a dedicated system.

For example, the computer program for executing the foregoing operation may be stored in a computer readable recording medium (flexible disk, CD-ROM, DVD-ROM or the like) for distribution, and may be installed on a computer to realize the eye detecting device 1 which performs the foregoing processing. The computer program may be stored in a storage device provided in a server unit on a communication network, such as the Internet, and be downloaded or the like onto an ordinary computer system to realize the eye detecting device 1.

In a case where the functions of the eye detecting device 1 are realized by the sharing of the OS (operating system) and an application program or collaboration of the OS with an application program, only the application program part may be stored in a recording medium or a storage device.

A computer program may be superimposed on a carrier wave to be distributed over a communication network. For example, the computer program may be placed on a BBS (Bulletin Board System) on a communication network, and may be distributed over the network. Then, the computer program may be invoked and executed like other application programs under the control of the OS to be able to execute the above-described processing.

This application claims the priority of Japanese Patent Application No. 2006-327430 filed with the Japan Patent Office on Dec. 4, 2006, whose contents are incorporated herein by reference.

INDUSTRIAL APPLICABILITY

The eye detecting device according to the invention is useful as a device of detecting an eye part of a driver of a vehicle and measuring the vigilance of the driver. In addition, the eye detecting method according to the invention can be adapted to a vehicle.

The invention claimed is:

1. An eye part detecting device comprising:
   image acquiring means that acquires a face image;
   edge obtaining means that obtains a plurality of horizontal edges each comprising a sequence of pixels of horizontally varying luminance, and a plurality of vertical edges each comprising a sequence of pixels of vertically varying luminance;
   eyelid candidate determination means that finds positional relations between the acquired plurality of horizontal and vertical edges, and determines horizontal edges and vertical edges between which a predetermined condition of positional relation is satisfied, as upper eyelid candidates and lower eyelid candidates which are paired with each other; and
   eyelid determination means that finds geometrical relations between the upper eyelid candidates and the lower eyelid candidates which are paired with each other, and determines an upper eyelid candidate and a lower eyelid candidate which are paired with each other and between which a predetermined condition of geometrical relation is satisfied, as the upper eyelid and the lower eyelid, respectively,
   wherein the eyelid candidate determination means includes lower eyelid candidate discriminating means that classifies the lower eyelid candidates into lower eyelid candidates and lower eyelid preliminary candidates whose vertical direction edges do not satisfy the predetermined condition thereof, and
   the eyelid determination means includes:
      lower eyelid candidate evaluating means that excludes that of the lower eyelid preliminary candidates classified by the lower eyelid candidate discriminating means in whose lateral direction the horizontal edge of at least one of the upper eyelid candidates exists; and
      upper-and-lower eyelid pair discriminating means that discriminates, as the upper-and-lower eyelid pair, a combination which satisfies the predetermined upper and lower eyelid positional condition among the combinations of the upper eyelid candidates and the lower eyelid candidates discriminated by the lower eyelid candidate discriminating means and those lower eyelid preliminary candidates which have not been excluded by the lower eyelid candidate evaluating means.

2. The eye part detecting device according to claim 1, comprising storage means that stores positional relations between the upper eyelid candidates and the lower eyelid candidates which are determined by the eyelid candidate determination means,
   wherein when the eyelid candidate determination means newly determines the upper eyelid candidates and the lower eyelid candidates, the eyelid determination means excludes a predetermined eyelid candidate from the upper eyelid candidates and the lower eyelid candidates based on the positional relations stored in the storage means.

3. The eye part detecting device according to claim 1 wherein the eyelid determination means includes:
lower eyelid candidate evaluating means that excludes that of the lower eyelid candidates which has at least one horizontal edge present in a lateral direction thereof; and
upper-and-lower eyelid pair determination means that discriminates a combination, which satisfies a predetermined upper and lower eyelid positional condition, of the combinations of the upper eyelid candidates and the lower eyelid candidates except that one or those ones having been excluded by the lower eyelid candidate evaluating means, and determines the discriminated combination as an upper-and-lower eyelid pair.

4. The eye part detecting device according to claim 3, wherein the eyelid determination means determines whether or not a number of the lower eyelid candidates determined by the eyelid candidate determination means is equal to or less than a predetermined number, and
the lower eyelid candidate evaluating means does not exclude the lower eyelid candidates when the eyelid determination means determines that the number is equal to or less than the predetermined number.

5. The eye part detecting device according to claim 1, wherein the lower eyelid candidate discriminating means
finds a length, a center of gravity, and a maximum point or minimum point of the vertical edge of the lower eyelid candidates, and
classifies the lower eyelid candidates into lower eyelid preliminary candidates and lower eyelid candidates based on at least one of a vertical distance between the center of gravity and the maximum point or minimum point and a ratio of the vertical distance to the length.

6. The eye part detecting device according to claim 1, wherein the upper-and-lower eyelid pair discriminating means
finds lengths and centers of gravity of the vertical edge of the upper eyelid candidates and the vertical edge of the lower eyelid candidates, and discriminates
the upper-and-lower eyelid pair from the combinations of the upper eyelid candidates and the lower eyelid candidates based on at least one of an absolute value of a difference between the length of the vertical edge of the upper eyelid candidates and the length of the vertical edge of the lower eyelid candidates, a horizontal distance between the center of gravity of the vertical edge of the upper eyelid candidates and the center of gravity of the vertical edge of the lower eyelid candidates, and a distance between the center of gravity of the vertical edge of the upper eyelid candidates and the center of gravity of the vertical edge of the lower eyelid candidates.

7. An eye part detecting method comprising:
an edge obtaining step of obtaining a plurality of horizontal edges each comprising a sequence of pixels of horizontally varying luminance, and a plurality of vertical edges each comprising a sequence of pixels of vertically varying luminance;
an eyelid candidate determination step of finding positional relations between the acquired plurality of horizontal and vertical edges, and determines horizontal edges and vertical edges between which a predetermined condition of positional relation is satisfied, as upper eyelid candidates and lower eyelid candidates which are paired with each other; and
an eyelid determination step of finding geometrical relations between the upper eyelid candidates and the lower eyelid candidates which are paired with each other, and determining an upper eyelid candidate and a lower eyelid candidate which are paired with each other and between which a predetermined condition of geometrical relation is satisfied, as the upper eyelid and the lower eyelid, respectively,
wherein the eyelid candidate determination step includes a lower eyelid candidate discriminating step that classifies the lower eyelid candidates into lower eyelid candidates and lower eyelid preliminary candidates whose vertical direction edges do not satisfy the predetermined condition thereof, and
the eyelid determination step includes:
a lower eyelid candidate evaluating step that excludes that of the lower eyelid preliminary candidates classified by the lower eyelid candidate discriminating step in whose lateral direction the horizontal edge of at least one of the upper eyelid candidates exists; and
a upper-and-lower eyelid pair discriminating step that discriminates, as the upper-and-lower eyelid pair, a combination which satisfies the predetermined upper and lower eyelid positional condition among the combinations of the upper eyelid candidates and the lower eyelid candidates discriminated by the lower eyelid candidate discriminating step and those lower eyelid preliminary candidates which have not been excluded by the lower eyelid candidate evaluating step.

8. A non-transitory computer-readable medium having embodied thereon a program which, when executed by a computer, causes the computer to function as:
image acquiring means that acquires a face image;
edge obtaining means that obtains a plurality of horizontal edges each comprising a sequence of pixels of horizontally varying luminance, and a plurality of vertical edges each comprising a sequence of pixels of vertically varying luminance;
eyelid candidate determination means that finds positional relations between the acquired plurality of horizontal and vertical edges, and determines horizontal edges and vertical edges between which a predetermined condition of positional relation is satisfied, as upper eyelid candidates and lower eyelid candidates which are paired with each other; and
eyelid determination means that finds geometrical relations between the upper eyelid candidates and the lower eyelid candidates which are paired with each other, and determines an upper eyelid candidate and a lower eyelid candidate which are paired with each other and between which a predetermined condition of geometrical relation is satisfied, as the upper eyelid and the lower eyelid, respectively,
wherein the eyelid candidate determination means includes lower eyelid candidate discriminating means that classifies the lower eyelid candidates into lower eyelid candidates and lower eyelid preliminary candidates whose vertical direction edges do not satisfy the predetermined condition thereof, and
the eyelid determination means includes:
lower eyelid candidate evaluating means that excludes that of the lower eyelid preliminary candidates classified by the lower eyelid candidate discriminating means in whose lateral direction the horizontal edge of at least one of the upper eyelid candidates exists; and upper-and-lower eyelid pair discriminating means that discriminates as the upper-and-lower eyelid pair, a combination which satisfies the predetermined upper and lower eyelid positional condition among the combinations of the upper eyelid candidates and the lower eyelid candidates discriminated by the lower eyelid candidate discriminating means and those lower eyelid preliminary candidates which have not been excluded by the lower eyelid candidate evaluating means.

9. An eye part detecting device according to claim 1, further comprising:

alarming means that gives an alarm to outside;

alarm control means that finds an eyelid positional relation that indicates a positional relation between the upper eyelid and the lower eyelid determined by the eyelid determination means, and causes the alarming means to raise an alarm when the eyelid positional relation satisfy a predetermined condition.

* * * * *